United States Patent [19]

Jagiella et al.

[11] Patent Number: 5,218,311
[45] Date of Patent: Jun. 8, 1993

[54] MEASURING DEVICE AND METHOD FOR ITS OPERATIONAL SETTING

[75] Inventors: Manfred Jagiella, Karlsruhe; Kilian Barth, Forbach; Ahmet Topkaya, Karlsruhe, all of Fed. Rep. of Germany

[73] Assignee: C. A. Weidmuller GmbH & Co., Detmold, Fed. Rep. of Germany

[21] Appl. No.: 719,808

[22] Filed: Jun. 24, 1991

[30] Foreign Application Priority Data

Jun. 25, 1990 [DE] Fed. Rep. of Germany ....... 4020196

[51] Int. Cl.$^5$ ............................................. G01R 27/08
[52] U.S. Cl. .................................... 324/683; 324/658; 324/662
[58] Field of Search ............... 324/658, 661, 662, 681, 324/683, 654, 684, 699, 709, 716, 720; 73/718, 724

[56] References Cited

U.S. PATENT DOCUMENTS 4,167,697  9/1979  Gerber .................................. 324/661
4,228,392 10/1980  Abbe et al. .......................... 324/662
4,724,709  2/1988  Antonazzi, Sr. et al. ...... 324/683 X Primary Examiner—Kenneth A. Wieder
Assistant Examiner—Glenn W. Brown
Attorney, Agent, or Firm—Anderson Kill Olick & Oshinsky

[57] ABSTRACT

In a measuring device which serves to measure a geometrical variable with the use of a sensor which is fed an alternating measuring current of constant amplitude by a regulated, phase-dependent current source. An alternating supply voltage and an alternating measuring voltage tapped by the sensor via a feedback path of the current source is superimposed in a superimposition stage, which belongs to the current source and downstream of which a reference element for determining the alternating measuring current is connected, to form a total voltage present at the reference element. In order to match a characteristic representing the relationship between the alternating measuring voltage and the geometrical variable to a prescribed characteristic curve, at least one of the alternating voltages fed to the superimposition stage is varied. The variation can concern both the amplitude and the phase.

23 Claims, 2 Drawing Sheets

MEASURING DEVICE AND METHOD FOR ITS OPERATIONAL SETTING

The invention relates to an operational setting method for a device for measuring a geometrical variable, and to such a device for measuring a geometrical variable using a sensor and a phase-dependent current source for supplying an alternating measuring current of constant amplitude to the sensor. The geometrical variable can be, for example, a distance or spacing between a sensor head and an object, for example, a workpiece, the thickness of an object, or the like.

BACKGROUND OF THE INVENTION

The prior art already includes a device for the capacitive measurement of a distance between a sensor head and a workpiece in which a regulated, phase-dependent current source is used. The phase-dependent current source is fed an alternating supply voltage upon which there is superimposed an alternating measuring voltage that is tapped at the sensor head, to be precise via a feedback path of the phase-dependent current source.

The phase-dependent current source, in which the amplitude of the alternating current is constant for the fixed phase in each case but changes with the phase, is realized in terms of circuit engineering by a control circuit which holds a voltage constant across a constant reference element in order thus to hold constant the amplitude of the alternating current through this reference element.

If the sensor head is exchanged for another, this is generally bound up, however, with changing the measuring capacitor, since the geometrical dimensions of the sensor heads differ from one another as a rule. The result is a different characteristic between the alternating measuring voltage and the geometrical variable, so that the said known measuring device has little flexibility as to the exchange of the sensor head.

Moreover, it is frequently desired that the alternating measuring voltage or its amplitude is as linear as possible with respect to the geometrical variable to be measured, that is to say, in the present case with respect to the distance. It is possible to guarantee in this way that when the sensor head is used for distance measurement in a closed control loop of a sensor system, the dynamic response of the control loop is independent of a distance. Otherwise, in the case of excessively large distances, the distance control could be performed too slowly, and in the case of excessively small rated distances the sensor system could begin to oscillate.

A capacitive sensor head, by means of which the conditions in an ideal plate capacitor can be simulated, is used in the measuring device mentioned at the beginning for the purpose of guaranteeing the linearity between the alternating measuring voltage and the distance.

If, however, use is made of a sensor head having an electrode shape that no longer ensures the linearity between the alternating measuring voltage and the distance, then, as described above, problems occur in regulating the distance with the aid of the sensor system containing the measuring device.

SUMMARY OF THE INVENTION

It is an object of the invention to provide a method by means of which the operation of the measuring device can be set or tuned to different sensors, as well as a measuring device of the type mentioned above capable of functioning so as to render such a setting possible.

Pursuant to this object, and others which will become apparent hereafter, one aspect of the present invention relates to an operational setting method for a measuring device which serves to measure a geometrical variable with the use of a sensor which is fed an alternating measuring current of constant amplitude by a regulated, phase-dependent current source. An alternating supply voltage and an alternating measuring voltage tapped by the sensor via a feedback path of the current source is superimposed in a superimposed state which belongs to the current source and downstream of which a reference element for generating the alternating measuring current is connected, to form a total voltage present at the reference element. It is a characterizing feature of the operating setting method according to the invention that, in order to match a characteristic representing the relationship between the alternating measuring voltage and the geometrical variable to a prescribed characteristic curve, at least one of the alternating voltage fed to the superimposition stage is varied. The variation can concern both amplitude and phase.

If, for example, a first sensor head is then exchanged for a second sensor head of different geometry, the alternating measuring current flowing through the refrence element can be varied by varying the amplitude of the alternating supply voltage in such a way that approximately the same characteristic between the alternating measuring voltage and the geometrical variable is obtained in the case of the second sensor head as in the case of the first sensor head. The measuring device can therefore be used for a multiplicity of different sensor heads, so that its field of application or range of use is relatively large.

For the purpose of matching the characteristic after the exchange of a sensor head, it is possible, for example, for the amplitude of the alternating supply voltage to be set in a first setting operation in such a way that when the geometrical variable is set to the value zero, the alternating measuring voltage likewise has the value zero. Subsequently, the alternating supply voltage can be varied in a second setting operation in such a way that when the geometrical variable is set to a predetermined value greater than zero the alternating measuring voltage likewise assumes a predetermined setting value greater than zero. In other words, for the new sensor head two points of its characteristic between the alternating measuring voltage and the geometrical variable are brought into coincidence with two corresponding points of the characteristic of the first sensor head. This can be obtained merely by varying the amplitude of the alternating supply voltage, so that matching the measuring device to new sensor heads can be carried out relatively simply.

According to a very advantageous development of the invention, a phase shift is set between the alternating supply voltage and the alternating measuring voltage, and thereafter a characteristic is plotted between the alternating supply voltage and the alternating measuring voltage, and thereafter a characteristic is plotted between the alternating measuring voltage and the geometrical variable, these operations being repeated with variation of the phase shift until the plotted characteristic is linear.

Depending on the type or shape of the sensor, it is thus possible to vary the phase between the alternating supply voltage and the alternating measuring voltage in such a way that when different sensors are used, linearity is once again obtained between the alternating measuring voltage and the geometrical variable, so that for each sensor the dynamic response of the control loop of the sensor system in which the measuring device is used is independent of the geometrical variable to be measured.

A device according to the invention for measuring a geometrical variable with the use of a sensor contains a phase-dependent current source for feeding an alternating measuring current of constant amplitude to the sensor, which current source has a superimposition or summer stage with a downstream reference element for generating the alternating measuring voltage, which superimposition stage serves to superimpose an alternating supply voltage together with an alternating measuring voltage tapped by the sensor via a feedback path of the current source to form a total voltage present at the reference element. It is a characteristic feature of this device that a setting device is present for setting the amplitude of the alternating supply voltage applied to the superimposition stage, and/or a phase-setting element for setting a phase shift between the alternating supply voltage and the alternating measuring voltage is arranged in the feedback path of the phase-dependent current source.

Preferably, the phase-setting element is located between an impedance converter, present in the feedback path, and the superimposition stage for superimposing the alternating supply voltage and alternating measuring voltage.

Thus, the measuring device according to the invention permits, on the one hand, the matching of the respective characteristics between the alternating measuring voltage and geometrical variable to a prescribed characteristic when there is an exchange of sensor heads and, on the other hand, the linearization of the characteristics for the respective sensor heads. In this process, the matching and linearization can occur alternatively or jointly.

Basically, it is possible to generate the alternating measuring voltage in a capacitive, inductive or resistive fashion.

According to an advantageous embodiment of the invention, the sensor is, however, constructed as a capacitive sensor, as a result of which, inter alia, particularly sensitive distance and thickness measurements are possible.

In the case of capacitive sensors, the reference element can be a resistor, so that a phase shift that is dependent on the value of the geometrical variable, for example on the distance, results at the RC element thus obtained. This phase shift influences the action of the phase-dependent current source, so that in conjunction with the phase shift effected by the phase-setting element a linearization of the characteristics is produced. In this arrangement, the resistance value of the reference resistor is at least approximately as large as the capacitive reactance formed between the sensor head and workpiece. The capacitance between the sensor head and workpiece is smaller than 1 pF, as a rule, so that with the use of a capacitor as reference element the latter ought likewise to be smaller than 1 pF. Such a reference capacitor can be produced only with difficulty. By contrast, a resistor used as the reference element can be located in the MΩ range, this reference resistor being available as an off-the-shelf component, which leads to a reduction in the price of the circuit.

The phase shift between the alternating supply voltage and the alternating measuring voltage can be carried out separately for each sensor, to be precise empirically by plotting the characteristic between the alternating measuring voltage and geometrical variable. The phase shift and plotting of the characteristic alternate one with another until there is a linear characteristic between the alternating measuring voltage and geometrical variable. Only then is the regulation of the geometrical variable, for example a distance regulation, carried out by the sensor system with the aid of the alternating measuring voltage in order, for example, to guide a cutting nozzle or the like at a constant distance over a workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The invention is described below with reference to the drawings, wherein.

DETAILED DESCRIPTION OF PREFERRED EMBODIMENTS

Figure 1:
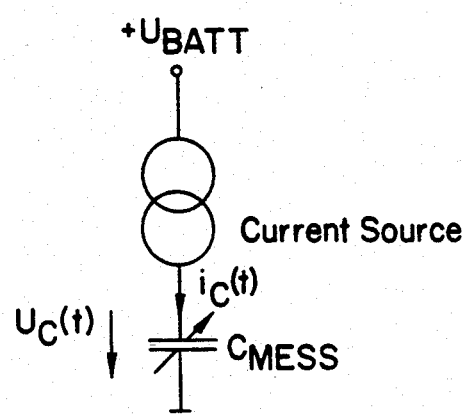
FIG. 1 shows a block diagram of one form of a measuring circuit with a current source for distance measurement.

A capacitive distance measurement with a linear output signal is explained with reference to FIG. 1. The measurement is performed with the use of a current source which is connected on the output side to a measuring capacitor $C_{MESS}$. The measuring capacitor $C_{MESS}$ is formed, for example, by a sensor head which is guided at a distance over a workpiece. The sensor head and workpiece each form one capacitor plate of the measuring capacitor $C_{MESS}$.

The current source receives a supply voltage $U_{BATT}$ and delivers on the output side an alternating current $i_C(t)$ of constant amplitude I. Denoting the reactance $1/\omega.C$ of the measuring capacitor $C_{MESS}$ by $X_C$, the following expression results for the voltage at the measuring capacitor $C_{MESS}$:

$$U_C(t) = X_C \cdot i_C(t) \qquad (1)$$

where $X_C = 1/\omega \cdot C$, $\omega = 2\pi f$ and $C = \epsilon \cdot A/d$ (holds for an ideal plate capacitor), and with $i_C(t) = I \cdot \sin(\omega t)$, it follows that:

$$U_C(t) = \frac{d \, I \cdot \sin 2\pi ft}{\epsilon \cdot A \cdot 2\pi f} \qquad (2)$$

In this, d is the distance between the capacitor plates of the measuring capacitor $C_{MESS}$, $\epsilon$ the dielectric constant, f the frequency, A the area of the capacitor plates, and I the constant amplitude of the alternating current $i_C(t)$.

If the expression $1/\epsilon \cdot A \cdot 2\pi f$ is regarded as a constant, in as far as the frequency f is constant, the result is that:

$$U_C(t) = d \cdot \sin 2\pi ft \quad (3)$$

and we thus obtain at the measuring capacitor $C_{MESS}$ a sinusoidal measuring voltage $U_C(t)$ whose amplitude is directly proportional to the distance d.

In the present case, the current source can be a phase-dependent current source which is realized in terms of circuit engineering by a control circuit which holds a voltage constant across a constant reference element which, for example, can be a resistor. Consequently, the current through this reference element is constant.

Figure 2:
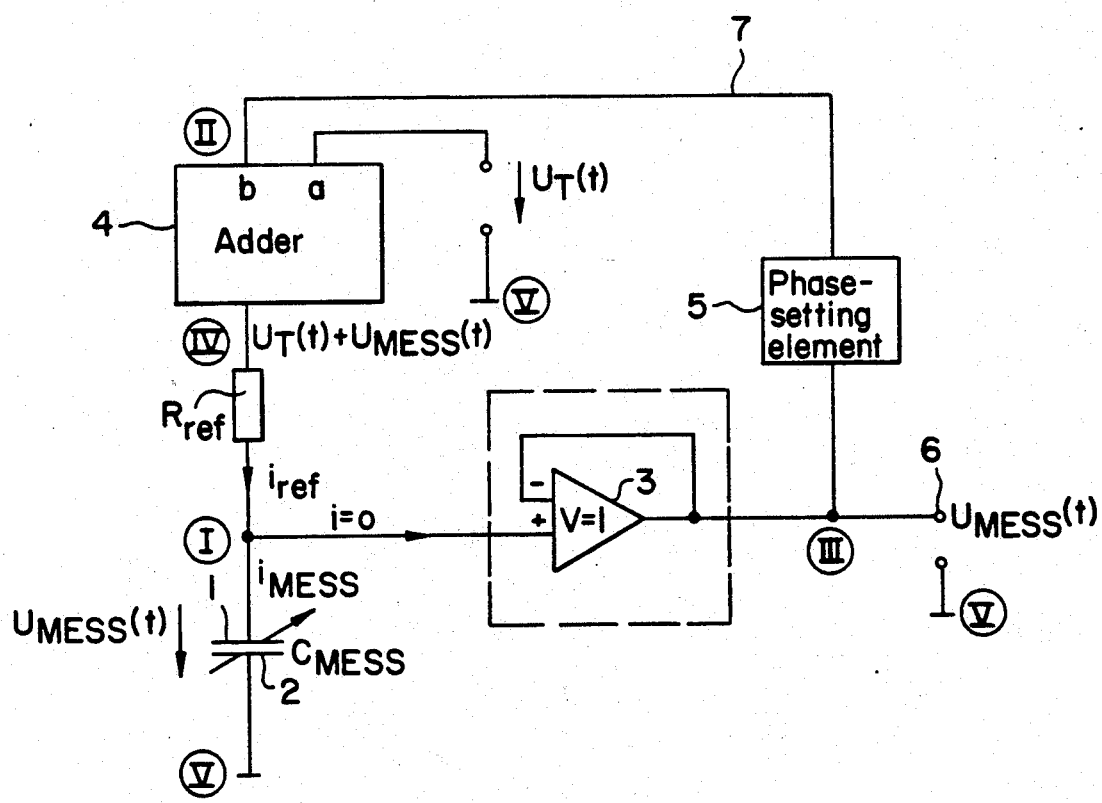
FIG. 2 shows a block diagram of one form of a device according to the invention along the lines of a first exemplary embodiment.

FIG. 2 shows a first exemplary embodiment of a measuring circuit according to the invention, which contains such a phase-dependent current source. The circuit will be explained once again in conjunction with a capacitive distance measurement.

This circuit likewise has the measuring capacitor $C_{MESS}$ which, as already mentioned previously, is formed by the sensor head and the workpiece. Let the sensor head be provided here with the reference symbol 1, while the workpiece bears the reference symbol 2. The measuring voltage $U_{MESS}(t)$ (corresponding to the voltage $U_C(t)$ in FIG. 1) falls across the measuring capacitor $C_{MESS}$. The measuring capacitor $C_{MESS}$ is connected via the sensor head 1 to a terminal of a reference resistor $R_{ref}$ and, furthermore, to a positive input of an impedance invertor 3. The other terminal of the reference resistor $R_{ref}$ is connected to the output of an adder 4, which receives at its first input a an alternating supply voltage $U_T(t) = U \cdot \sin (\omega t)$. The other input b of the adder 4 is connected to the output of a phase element 5 whose input is connected, on the one hand, to the output of the inpedance converter 3 and, on the other hand, to an output terminal 6 of the distance measuring circuit. Moreover, the output of the impedance converter 3 is fed back to its negative input. The workpiece 2, which forms the second capacitor plate of the measuring capacitor $C_{MESS}$, is grounded. The branch line 7 containing the impedance converter 3 and the phase element 5 can be designated as a feedback path. The adder 4 is, for example, an operational amplifier or a transformer.

The mode of operation of the circuit shown in FIG. 2 is explained in more detail below.

As is to be seen, the measuring voltage $U_{MESS}(t)$ falls between the nodes I and V. Since the impedance converter 3 has a gain V=1 and serves only for voltage decoupling, the voltage $U_{MESS}(t)$ also appears at the output of the impedance converter 3 and thus also between the nodes III and V. The measuring voltage $U_{MESS}(t)$ is present, furthermore, at the second input b of the adder 4, that is to say at the node II. Thus, there is present at the output of the adder 4 the sum of the two input voltages $U_{MESS}(t)$ and $U_T(t)$, which is present at the node IV.

Since $U_T(t) + U_{MESS}(t)$ is present at the node IV and $U_{MESS}(t)$ at the node I, the voltage $U_T(t)$ must fall at the resistor $R_{ref}$, to be precise, independently of the level of the measuring voltage $U_{MESS}(t)$. Consequently, the current through the resistor $R_{ref}$ depends only on the voltage $U_T(t)$.

Since the constant alternating voltage $U_T(t) = U \cdot \sin (\omega t)$ is present at the adder input a of the adder 4, we obtain an alternating current on the output side of $$i_{ref}(t) = I \cdot \sin (\omega t) \quad (4)$$

where $I = U/R_{ref}$. The input current i of the impedance converter 3 is much smaller than $i_{ref}(t)$, so that following relationship holds:

$$i_{ref}(t) = i_{MESS}(t) \quad (5)$$

An alternating current $i_{MESS}$ of constant amplitude flows through the measuring capacitor $C_{MESS}$. The voltage $U_{MESS}(t)$ falling at the measuring capacitor $C_{MESS}$ is thus linearly proportional to the measuring distance d. The measuring distance d is the distance between the capacitor plates 1 and 2 of the measuring capacitor $C_{MESS}$, and in the present case forms the geometrical variable mentioned.

The circuit represented in FIG. 2 is a control circuit whose task is to hold constant the voltage across the reference resistor $R_{ref}$, and thus the current $i_{ref}$ which flows through the reference resistor $R_{ref}$. The current $i_{ref}$ is thus an alternating current of constant amplitude.

As in every dynamic control loop, the phase of the variable that is fed back plays a decisive role. If the phase condition is not fulfilled, the negative feedback becomes positive feedback, so that the control no longer functions. This must be borne in mind when dimensioning the circuit, since in the case of the reference resistor $R_{ref}$ the measuring capacitor $C_{MESS}$ forms together with the reference resistor $R_{ref}$ an additional RC element, whose phase varies with the distance of the sensor. Too large a phase variation can be compensated with the aid of the phase-setting element 5 by appropriate setting, so that a stable control is obtained for all measuring distances.

The most important task of the phase-setting element 5 resides, however, in the additional linearilizality of the distance characteristic, that is to say, the characteristic which represents the relationship between the alternating measuring variable (measuring voltage $U_{MESS}(t)$) and the geometrical quantity, here the distance d, for example.

The formula $C = \epsilon \cdot A/d$ used at the beginning holds only for the ideal plate capacitor, that is to say, for two plane-parallel, opposite and identically large surfaces whose dimensions are much larger than the mutual distance. The field lines extend parallel between the surfaces, no stray fiend being present.

This condition is not fulfilled for most sensor heads, since there, for example, a nozzle forms one capacitor surface and the workpiece the other. The last mentioned formula therefore holds only approximately. Consequently, at the terminal 6 the output voltage $U_{MESS}(t)$ of the measuring circuit is not so linear relative to the distance d as is to be expected according to equation (3).

This nonlinearity can be eliminated by the phase-setting element 5; By setting a phase shift between the voltage $U_T(t)$ and the measuring voltage $U_{MESS}(t)$, it is possible to obtain an additional biasing of the characteristic in order to counteract the nonlinearity. Tests have shown that this way leads to good linearization results without endangering the stability of the control circuit.

For this purpose, after selection of a specific sensor head the characteristic between the measuring voltage $U_{MESS}(t)$ and the distance d is plotted, this operation being repeated with adjustment of the phase shift between the supply voltage $U_T(t)$ and the measuring voltage $U_{MESS}(t)$ until said characteristic is linear. It is then stored, and used for the purpose of distance control with the aid of the sensor system. The linearity can be judged, for example, by a user, or be evaluated electronically by an evaluation circuit.

The phase-setting element 5 can be, for example, an allpass filter, which is generally known. Allpass filter of first and second order are described, for example, in U. Tietze, Ch. Schenk, *Halbeiter-Schaltungstechnik (Semiconductor Circuit Engineering)*, Springer-Verlag (Springer Publishing) (1985), 7th Ed., pages 431 to 433.

The phase-setting element 5 can alternatively be constructed as a low-pass filter, high-pass filter or bandpass filter, so that signal disturbances can additionally be filtered out.

Of course, it is also possible in this way and with the use of inductive or resistive sensors to produce a linearity between the alternating measured variable and a corresponding geometrical variable.

Figure 3:
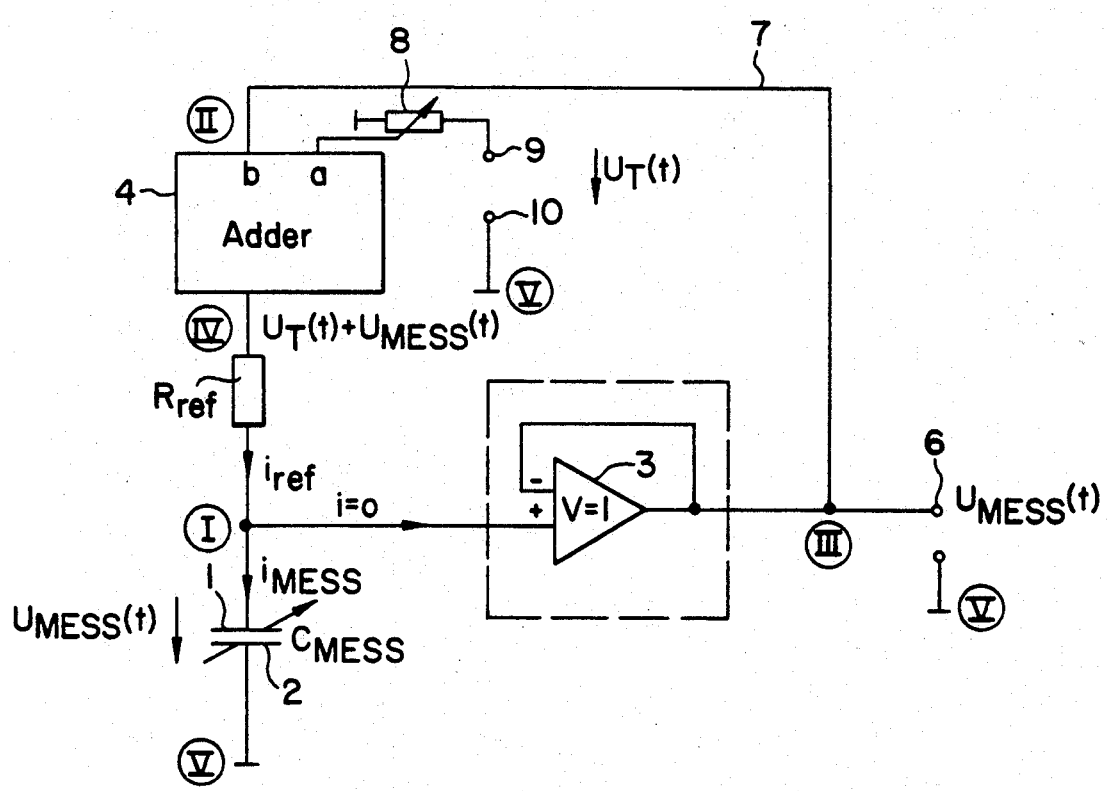
FIG. 3 shows a block diagram of a device according to the invention along the lines of a second exemplary embodiment.

FIG. 3 shows a second exemplary embodiment of a measuring circuit according to the invention. This measuring circuit differs from the measuring circuit shown in FIG. 2 in that the phase-setting element in the feedback path between the output of the impedance converter 3 and the input b of the adder 4 is omitted. Instead, the output of the impedance converter 3 is directly connected to the input b of the adder 4 via the line 7. The alternating supply voltage $U_T(t)$ is located between the terminals 9 and 10, the latter being grounded. By contrast, the terminal 9 is connected via a potentiometer 8 to the input a of the adder 4. Otherwise, the structure of the second exemplary embodiment in accordance with FIG. 3 corresponds to that of the first exemplary embodiment in accordance with FIG. 2.

With the aid of the potentiometer 8, the amplitude of the alternating supply voltage $U_T(t)$ present at the input a of the adder 4 can be set, so that in this way the characteristic between the alternating measuring voltage and geometrical variable can be matched to a predetermined characteristic for a sensor head connected to the measuring device.

The potentiometer 8 in accordance with FIG. 3 can also be connected in the case of the first exemplary embodiment in accordance with FIG. 2 to the input a of the adder 4, so that in addition to the phase shift between the alternating supply voltage and alternating measuring voltage it is then also possible to set the amplitude of the alternating supply voltage.

The potentiometer 8 can also be an electronically settable resistor which can be set by an electronic circuit, which compares the characteristic between the alternating measuring voltage and geometrical variable for a new sensor head, and varies the value of the resistor 8 as a function of the result of the comparison in such a way that the two characteristics agree at least approximately. A manual setting of the resistor 8 can thus be eliminated.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. An operational setting method for a measuring device which serves to measure a geometrical variable with the use of a sensor, the measuring device including a regulated phase-dependent current source having a summer stage, a reference element, an alternating supply voltage connected to a first input of the summer stage, and a feedback path connected between an output of the reference element and a second input of the summer stage, the reference element having its input connected to the output of the summer stage and determining an alternating measuring current supplied from its output to the sensor, said method comprising the steps of:

feeding from the current source to the sensor the alternating measuring current of constant amplitude to generate across the sensor an alternating measuring voltage tapped at the sensor via the feedback path and supplied to the second input to output a voltage from the summer stage to the reference element; and in order to match a characteristic representing the relationship between the alternating measuring voltage and the geometrical variable to a prescribed characteristic curve, varying at least one of the alternating supply and measuring voltages fed to the summer stage by at least one of a setting device for setting the amplitude of the alternating supply voltage and a phase-setting element arranged in the feedback path for setting a phase shift between the alternating supply voltage and the alternating measuring voltage.

2. The operational setting method as claimed in claim 1, wherein the amplitude of the alternating supply voltage ($U_T(t)$) is varied.

3. The operational setting method as claimed in claim 2, wherein the amplitude of the alternating supply voltage ($U_T(t)$) is set in a first setting operation in such a way that when the geometrical variable (d) is set to the value zero, the alternating measuring voltage ($U_{Mess}(t)$) likewise has the value zero, and is varied in a second setting operation in such a way that when the geometrical variable (d) is set to a predetermined value greater than zero, the alternating measuring voltage ($U_{MESS}(t)$) likewise assumes a predetermined setting value greater than zero.

4. The operational setting method as claimed in claim 1, wherein a phase shift is set between the alternating supply voltage ($U_T(t)$) and the alternating measuring voltage ($U_{MESS}(t)$) and thereafter a characteristic is plotted between the alternating measuring voltage ($U_{MESS}(t)$) and the geometrical variable (d), and these operations are repeated while varying the amount of the phase shift until the plotted characteristic is linear.

5. The operational setting method as claimed in claim 4, wherein in order to set the phase shift the phase of the alternating measuring voltage ($U_{MESS}(t)$) is shifted.

6. The operational setting method as claimed in claim 1, wherein the alternating measuring voltage ($U_{MESS}(t)$) is generated in a capacitive fashion.

7. The operational setting method as claimed in claim 1, wherein the alternating measuring voltage ($U_{MESS}(t)$) is generated in an inductive fashion.

8. The operational setting method as claimed in claim 1, wherein the alternating measuring voltage ($U_{MESS}(t)$) is generated in a resistive fashion.

9. A device for measuring a geometrical variable with the use of a sensor, comprising:

a phase dependent current source for feeding an alternating measuring current of constant amplitude to the sensor, and including a summer stage having input means and output means, a reference element having an input connected to said output means for determining the alternating measuring current and an output for outputting the alternating measuring current, and a feedback path for connecting said reference element output with said input means for inputting an alternating measuring voltage tapped at the sensor, whereby said summer stage superimposes an alternating supply voltage of said current source with the alternating measuring voltage tapped at the sensor to output a voltage to said reference element; and at least one of a device for setting an amplitude of the alternating supply voltage applied to said summer stage, and a phase-setting element arranged in said feedback path for setting a phase shift between the alternating supply voltage and the alternating measuring voltage.

10. The device as claimed in claim 9, further comprising an impedance converter (3) in the feedback path and wherein the phase-setting element (5) is located between the impedance converter (3) and the summer stage (4) for superimposing the alternating supply voltage ($U_T(t)$) and alternating measuring voltage ($U_{MESS}(t)$).

11. The device as claimed in claim 10, wherein a parasitic input capacitance of the impedance converter (3) is substantially smaller than a measuring capacitance ($C_{MESS}$) present between the sensor head (1) and workpiece (2).

12. The device as claimed in claim 9, wherein the sensor (1) is a capacitive sensor.

13. The device as claimed in claim 12, wherein in order to form a capacitive sensor, a sensor head (1) acting as a capacitor electrode can be displaced relative to a workpiece (2).

14. The device as claimed in claim 9, wherein the reference element of the phase-dependent current source is an ohmic resistor ($R_{ref}$).

15. The device as claimed in claim 14, wherein the resistance value of the reference resistor ($R_{ref}$) is at least approximately as large as the value of the capacitive reactance ($X_C$) formed between the sensor head (1) and workpiece (2).

16. The device as claimed in claim 9, wherein the phase-setting element (5) is an allpass filter.

17. The device as claimed in claim 9, wherein the phase-setting element (5) is a low-pass filter.

18. The device as claimed in claim 9, wherein the setting device (8) is a potentiometer (8) or an electronically settable resistor.

19. The device as claimed in claim 9, wherein both the setting device (8) and the phase-setting element (5) are provided.

20. The device as claimed in claim 9, wherein the phase-setting element (5) is a high-pass filter.

21. The device as claimed in claim 9, wherein the phase-setting element (5) is a band-pass filter.

22. The device as claimed in claim 9, wherein the sensor is an inductive sensor.

23. The device as claimed in claim 9, wherein the sensor is a resistive sensor.

* * * * *